Feb. 7, 1956  E. W. TODD  2,733,648
DISK HARROW BEARING ASSEMBLY
Filed March 5, 1954

INVENTOR.
EVERETT W. TODD
By James E. Nilles
ATT'Y

United States Patent Office 2,733,648
Patented Feb. 7, 1956

2,733,648

DISK HARROW BEARING ASSEMBLY

Everett W. Todd, Racine, Wis., assignor to Massey-Harris-Ferguson Inc., a corporation of Maryland Application March 5, 1954, Serial No. 414,457

3 Claims. (Cl. 97—220)

This invention relates to agricultural implements, such as disc harrows, disc plows, or disc bedders, and is more particularly concerned with a bearing assembly for such an implement.

It is an object of this invention to provide an improved bearing assembly in which the upper portion of the bearing proper is shielded by the support with which it is fastened to the implement frame, and which is protected at its underside by the bearing support on which it is mounted on the disc shaft.

It is an object of this invention to provide an improved bearing assembly, which is economical to manufacture, easily assembled, highly efficient in performing the functions for which it was designed, and which permits an economical manufacturing process for other parts of the gang assembly with which it is associated.

It is an object of this invention to provide an outer support structure in which a bearing can be adjusted for alignment, and also shielded against dust and other foreign matter, said support further preventing the accumulation of debris on the bearing.

It is another object of this invention to provide an inner support structure for a disc harrow bearing which serves as a spacer for the disc spools, forms an accurate support for the bearing proper so as to insure a running fit with other portions of the assembly and which effectively shields the bearing proper from obstructions.

It is a still further object of this invention to provide a disc harrow bearing assembly in which the bearing is adjustably supported in and shielded by the supporting hanger, and having means for mounting the bearing on the shaft which serve as spacers for the discs and together with the supporting hanger form effective protection for the bearing against foreign matter and obstructions.

It is another object of this invention to provide a bearing assembly for disc plows or harrows, which permits easy assembly of the disc gang and implement frame and insures proper initial alignment of the bearing as well as the maintaining of said alignment in operation.

It is an object of this invention to provide a generally improved bearing assembly for implements of this type.

Other objects and advantages of this invention will become more apparent as this disclosure progresses, reference being had to the following drawings in which.

Figure 1:
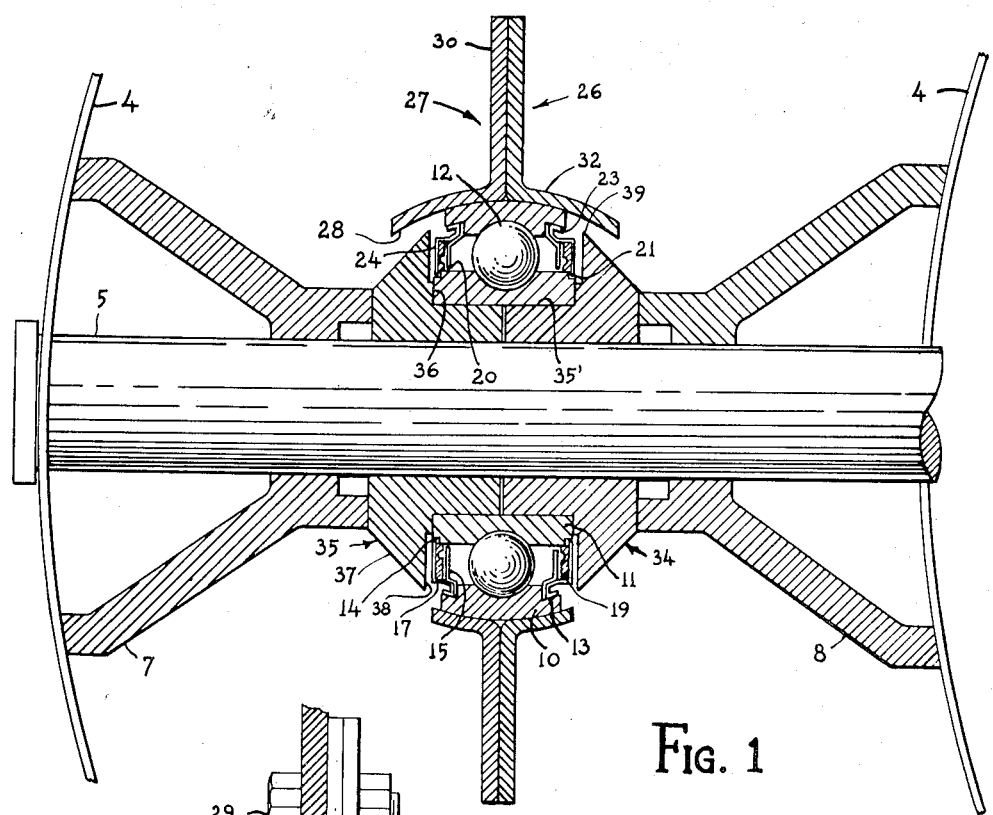
Figure 1 is an elevational sectional view through the center of the bearing assembly.

Referring more particularly to the drawings, a plurality of disk blades 4 are mounted on the shaft 5 and are maintained in axially spaced relationship by means of spacers or spools. In the embodiment shown, a two piece spool construction is used comprised of spools 7 and 8 which by themselves do not fill the space between the blades. From a standpoint of economy in manufacturing and assembly it is desirable that the spool be made of two pieces as will hereinafter be pointed out.

The bearing assembly, to which this invention relates, is located between these spool sections 7, 8.

The bearing proper consists of an outer race 10 and an inner race 11 between which are circumferentially spaced ball bearings 12. Races 10 and 11 have circumferentially arranged grooves 13 and 14 respectively around their outer edges, on either side thereof. The seal which protects the bearings is comprised of a flat off-set washer 15, and a second offset washer 17 between which is located a felt seal 19. These washers are press fitted into the annular groove 13 on the outer race and are rigidly secured thereto and rotate therewith. A close running fit is maintained between the inner edges 20, 21 of the washers 15 and 17 respectively, and thereby an effective seal is provided for the ball bearings. The washers 15—17 are necessarily made of very thin material and the edge 23 of washer 17 is expanded against the axial face of the groove 13 when the press fit is made. The washer 17 is exposed at its sides 24 to obstructions such as stumps and rocks while in use which seriously affects its life. Furthermore, a bearing of this type is subjected to severe working conditions so far as dust, dirt, and water are concerned and this invention contemplates the protection of the bearings in this regard. The bearing proper, thus far described, is of conventional design.

Figure 2:
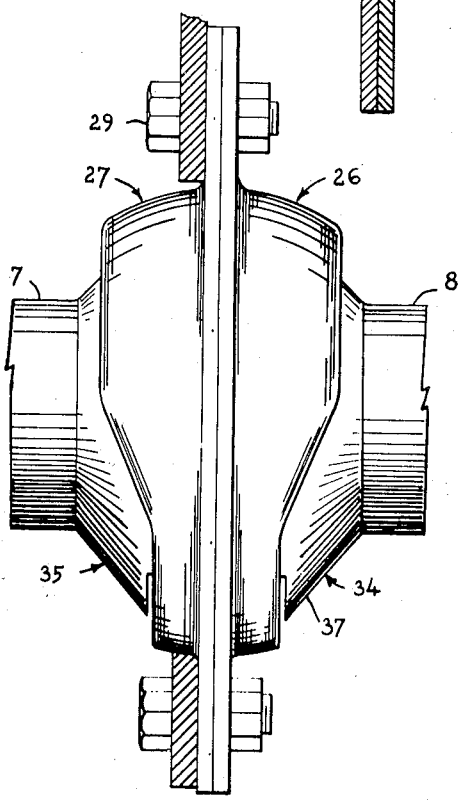
Figure 2 is a full elevational view of the assembly.

An outer support structure is provided for the bearing comprising a pair of complementary sections 26, 27 preferably stamped from heavy sheet steel, having "normal" flange portions 30 which extend normally from the shaft and an arcuate flange portion 32 extending in a substantially axial direction which defines a large aperture in which the bearing is located. The flange portions 32 have an inner spherical or concave surface 28 against which the outer race 10 bears and, to a limited extent is adjustable as to its eccentricity therewith. The support sections 26 and 27 are secured to the frame of the implement by bolts 29 extending through their normal flanges 30. For approximately the upper half of sections 26, 27 the axial flange portion 32 is of considerable width and provides an overhanging shield for the bearing, which protects it from dust and dirt that is thrown about while working. As shown in Figure 2, the flange 32 is considerably narrower at the lower half thereof for the purpose of allowing the dust, dirt or other debris to fall free of the bearing and prevent the collection of this material at the lower side of the bearing. As shown in Figure 1, the lower half of the flange 32 is slightly greater in width in an axial direction than the outer race, which provides a very effective relief for any debris that would otherwise accumulate and provides a full bearing surface even when flange 32 is positioned eccentrically to the shaft 5.

An inner support structure is provided which accurately aligns the bearing on the shaft 5 and which protects the bearing proper, particularly the thin washer 17, from contact with rocks or other obstructions which it may otherwise encounter while working. This bearing support is comprised of two identical collars 34, 35, positioned on shaft 5 between spools 7, 8. Each collar has a machined surface 35', 36, which forms a seat for the inner race 11 with which it rotates. The entire assembly on the shaft 5 is tightened by a nut (not shown) at the end of the shaft or by other conventional means, and the shaft; discs; spools 7, 8; collars 34, 35; and the inner race 11 all rotate as an integral unit.

The collar 34 has a "normal" flange 37 which extends, in a direction normal to the shaft 5, to approximately the same extent as washer 17 and has a normal surface 38 positioned in close axial relation to the washer 17. The side of the flange 37 opposite to surface 38 is inclined to allow it to have proper running clearance with flange 32 and at the same time cause debris to fall clear of the bearing. The outer edge 39 of the collar extends under the flange 32 of the support 26 and rotates in relation to the flange 32 and in proximity therewith. In order to prevent misalignment of the assembly and permit a close running fit between the edge 39, washer 17 and flange 32, it is necessary to machine only the collars 34, 35. A certain amount of wobble of the hubs 7, 8 is not detrimental.

By using a two spool construction, it is possible to simply cast the spools 7, 8 on end and no coring is required as in the case of a single bell hub. There is no machining required on spools 7, 8 because their concentricity is not necessary with this bearing assembly, it being sufficient to merely drill the spools. Concentricity between the shaft, bearing and the support 26 is assured by the use of the collars 34, 35, which are machined.

The outer race 10 of the bearing slides to a limited extent against the spherical surface 28 of the flange 32 and thereby insures proper alignment. As well as facilitating assembly, this construction provides an adjustable bearing support where it is desired to change the angle of the gang shafts in respect to the main frame of the implement.

This invention provides a self-aligning bearing assembly which is highly efficient in operation, economical to manufacture, easily assembled, and which is highly efficient in protecting the bearing against the severe working conditions to which it is constantly subjected.

Various features and objects of the invention not specifically enumerated herein will undoubtedly occur to those versed in the art, as likewise will numerous modifications and alterations in the preferred embodiment of the invention herein disclosed, all of which may be achieved without departing from the spirit and scope of the invention as defined in the appended claims.

What is claimed is:

1. In a disc harrow having spaced discs and a supporting shaft therefor: a spool adapted to be positioned on the shaft for spacing adjacent discs apart, said spool being made in two sections; an inner support structure on said shaft between said spool sections having a bearing surface on its periphery and a normally extending annular flange at either side thereof; a bearing comprising inner and outer races, said inner race mounted on said bearing surface, and said outer race having a convex periphery; an outer support having an internal concave surface against which bears the convex periphery for adjustment therein and having an axially extending flange portion, said flange portion being of such width in an axial direction for substantially the upper half thereof so as to overhang the normal flanges of said inner support structure, the lower half of said flange portion being of narrower width in an axial direction, said outer structure having a portion adapted to be secured to an implement frame.

2. A bearing assembly for an agricultural disc gang of the type having a pair of spool sections on the disc shaft between adjacent discs thereof comprising: an inner support structure on said shaft positioned between said spool sections, said structure having a bearing surface on the periphery thereof and also having normal annular flanges at either side of said bearing surface; a bearing, having inner and outer races, positioned on said bearing surface; an outer support structure having an axially extending flange portion with an internal concave surface for the adjustable mounting of said outer race, said axially extending flange portion for substantially the upper half thereof being of greater width in an axial direction than the lower half thereof adapted to overhang and shield said normal flanges of said inner support structure, said outer support structure also having a normally extending flange adapted to be secured to an implement frame.

3. A bearing assembly for an agricultural disk gang of the type having a pair of spool sections on the disk shaft between adjacent disks thereof comprising; an inner support structure on said shaft positioned between said spool sections comprising a pair of collars each having a bearing surface on the inner side of the periphery thereof and a normally extending flange portion on the outer side thereof; an outer support structure comprising a pair of complementary sections each having an axially extending flange portion which is of greater axial width for substantially the upper half thereof than its lower half and having an inner surface of concave shape, said flange portions so arranged so as to overhang said normal flanges of said collars, said sections having means adapted to be secured to an implement frame; a bearing comprising inner and outer races, said inner race mounted on said bearings surfaces of said collars and between the flanges thereof, said outer race having a convex periphery adapted to be adjustable supported by the inner concave surface of said outer support structure.

References Cited in the file of this patent

UNITED STATES PATENTS

| | | |
|---|---|---|
| 2,097,244 | Sjogren et al. | Oct. 26, 1937 |
| 2,247,685 | Hipple | July 1, 1941 |
| 2,294,234 | Johnston et al. | Aug. 25, 1942 |
| 2,566,991 | McKay | Sept. 4, 1951 |
| 2,657,957 | McNally | Nov. 3, 1953 |
| 2,676,853 | Shafer | Apr. 27, 1954 |